June 28, 1938. O. B. BROWN 2,122,174
APPARATUS FOR MIXING AND REACTING PURPOSES
Filed Oct. 19, 1937 2 Sheets-Sheet 2
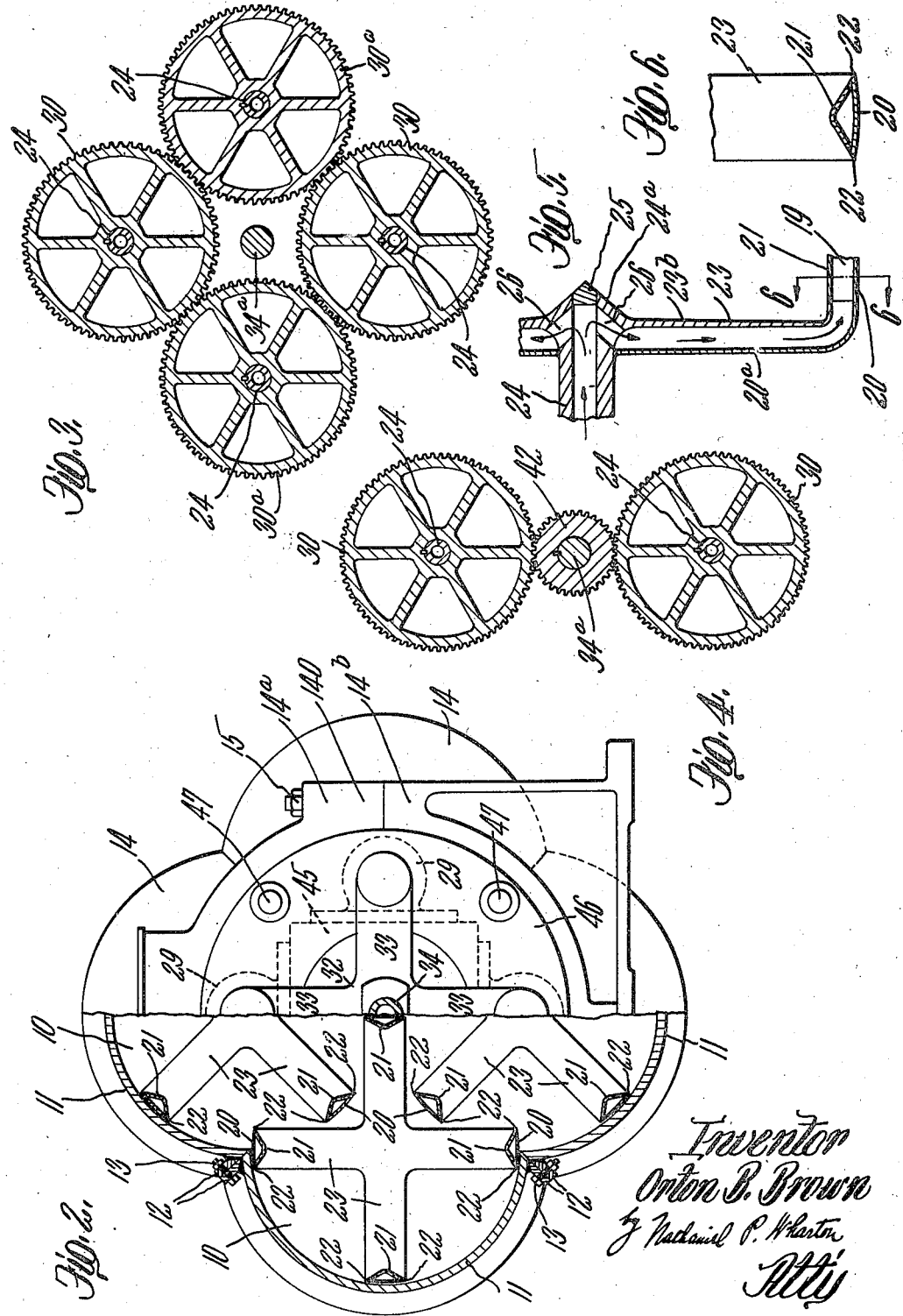

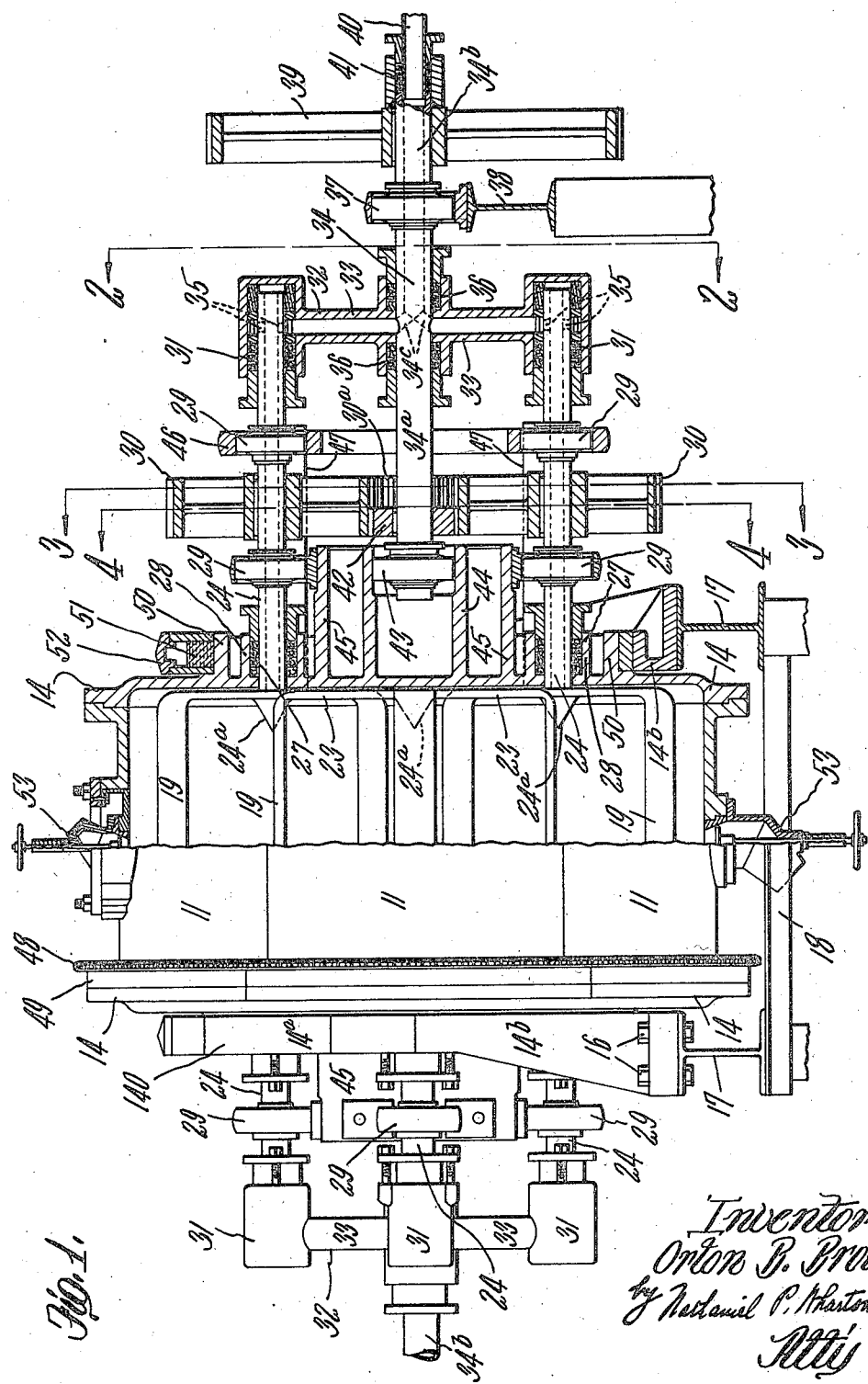

Patented June 28, 1938

2,122,174

UNITED STATES PATENT OFFICE 2,122,174

APPARATUS FOR MIXING AND REACTING PURPOSES

Orton B. Brown, Berlin, N. H., assignor to Brown Company, Berlin, N. H., a corporation of Maine Application October 19, 1937, Serial No. 169,818

5 Claims. (Cl. 259—3)

This invention relates to apparatus designed primarily for efficient mixing and reacting purposes, being more particularly concerned with apparatus adapted to work upon liquid or semi-liquid material. The apparatus hereof is fundamentally a modification of the apparatus disclosed and claimed in my application Serial No. 53,689, filed December 10, 1935, since, like the apparatus of that application, it also comprises essentially a plurality of intercommunicating mixing compartments each presenting an internal wall surface constituting a surface of revolution and each equipped with a rotary agitator or mixer having at least one blade substantially coextensive with and only slightly clearing such wall surface; and, like the apparatus of that application, the apparatus hereof is also provided with means for rotating the agitators and with means for being revolved itself about an axis resulting in repeated flow of the material being repeatedly scraped or removed from its wall surfaces back onto such wall surfaces.

In accordance with the present invention, the mixing compartments are defined more specifically by a plurality of substantially similar, semi-cylindrical walls or shells in side-by-side, annular array, the walls or shells being joined at their adjacent longitudinal edges so that their compartmental spaces merge to form in effect a single mixing chamber whose ends are closed. The parallelly-extending longitudinal axes of the substantially similar, adjoining semi-cylindrical walls or shells thus generate substantially coincidental cylindrical surfaces of revolution when the apparatus as a whole is being revolved about its axis. It is preferable to build the apparatus hereof symmetrically, that is, with an even number of semi-cylindrical walls or shells of substantially similar cylindrical curvature and size, so that the apparatus is balanced about its axis of revolution, which latter axis is stationed substantially horizontally and lies substantially in the cylindrical planes of curvature of such semi-cylindrical walls. With a symmetrical arrangement of the substantially similar, adjoining semi-cylindrical walls so that their axes extend horizontally in substantial parallelism to the axis of the apparatus as a whole or its mixing chamber, it becomes possible to rotate the agitators of the various compartments conveniently from a drive-shaft disposed coaxially with the apparatus as a whole or its mixing chamber and also to conduct a thermal-change fluid medium through hollow agitators or mixers conveniently by way of such drive shaft, one end portion of such drive shaft being hollow and communicating with the hollow agitators by way of hollow agitator-rotating shafts at one end of the machine and the agitator-shafts at the other end of the machine also being hollow and serving to conduct the medium to or from the blades to an idle shaft coaxial with and substantially similar in its structure to the drive shaft for the agitators.

With the foregoing and other features and objects in view, the invention hereof will now be described in further detail with particular reference to the accompanying drawings, wherein,—

Figure 1 is a composite front-elevational and longitudinal-sectional view of apparatus embodying the invention hereof, the right-hand end of the apparatus with its driving means for the agitators and its conductors for fluid thermal-change medium appearing in section.

Figure 2 is a composite end-elevational and transverse-sectional view of the apparatus, the end-elevational view being on the line 2—2 of Figure 1.

Figure 3 is a section through the driving end of the apparatus on the line 3—3 of Figure 1.

Figure 4 is a section through the same end of the apparatus on the line 4—4 of Figure 1, the driving gear on the axial drive shaft of the apparatus being shown.

Figure 5 is a detail section through an end portion of each mixing blade and the hollow shaft therefor.

Figure 6 is an enlarged section through the scraping edge of a mixing blade on the line 6—6 of Figure 5.

As appears more particularly in Figure 2, the mixing chamber or intercommunicating compartments 10 of the apparatus hereof may be defined by four semi-cylindrical walls or shells 11 which are of substantially the same curvature and size and give in cross-section the appearance of a symmetrical four-leaf clover, since the center or axis of the intercommunicating compartments 10 lies substantially in the cylindrical planes of curvature of the walls 11. The mixing chamber is thus in effect a merger of the compartmental mixing spaces within the semi-cylindrical walls or shells 11. Welded near the adjacent longitudinal edges of the shells may be outwardly projecting flanges 12 adapted to be brought together in abutting relationship and to be secured, as by bolts 13, into a compact structure to whose ends may be suitably secured closures 14. Each end closure 14 may be conveniently cast as four pieces and be equipped with outwardly projecting hubs for supporting various shafts and for itself being supported for rotation, as will hereinafter appear.

The agitator or mixer in each semi-cylindrical compartment may, as shown, comprise four separate blade elements 19 spaced 90° from one another and each substantially coextensive with and clearing only slightly the internal wall surface of the semi-cylindrical shell 11. In other words, the outer or scraping edges of the blade elements 19 may describe or generate substantially the same cylindrical surface in the course of the rotation of the agitator as a whole, in which cylindrical surface the axis of the mixing chamber lies, as best appears in Figure 2. In some instances, however, the scraping edges of the successive blade elements of an agitator may clear the internal wall surface of the shell 11 by different gaps so that such successive edges will serve to shear through different layers or strata of the material being mixed as such material is being repeatedly redeposited on the internal walls of the compartment or mixing chamber in the course of the revolvement of the apparatus as a whole.

The various blade elements 19 may advantageously be made hollow and of triangular cross section by welding a substantially flat or slightly outwardly convexed strip 20 to an inner angularly shaped strip 21, the use of strips of stainless steel or the like for such purpose enabling the realization of an adequately rigid blade whose active or shearing edges 22 are wedge-shaped and cut nicely through the material being mixed. The ends of such hollow blade elements 19 may, as appears in Figure 5, lead into hollow supporting arms 23 forming a cross-shaped, hollow spider at each end of an agitator. The several arms 23 may be formed by continuing and bending the strips 20 radially inwardly toward a center so that they constitute the outer walls 20a of such arms, the inner walls 23b of such arms being cast as a cross-shaped spider member integrally with a hollow shaft 24 by which the agitator is supported and rotated. The outer arm walls 20a may be secured by welding to the inner walls 23b. The inner end portion 24a of the hollow shaft 24 is preferably of a conical configuration whose apical portion is in the form of a plug 25 used to close the open inner end of the shaft as cast. Suitable apertures 26 may be formed through the hollow shaft 24 to the interiors of the hollow arms 23.

The hollow shafts 24 pass from the mixing chamber through suitable stuffing boxes 27, the packing of which is encompassed by hubs 28 projecting outwardly from the end closures 14 for the mixing chamber. Each shaft 24 continues beyond its stuffing box 27 through a pair of spaced ball bearings 29, between which a driving gear is affixed thereto, to a second or outer stuffing box 31. Each stuffing box 31 is shown as the outer terminus of a cross-shaped manifold 32 comprising pipes 33 for conducting thermal-change medium from a drive shaft 34 positioned substantially coaxially with the chamber 10. The pipes 33 communicate through apertures 35 in the hollow shafts 24 with the interiors of such shafts.

The inner ends of the pipes 33 terminate as a pair of aligned stuffing boxes 36 surrounding the shaft 34, whose portion 34a extending inwardly of the inner stuffing box 36 is solid and whose portion 34b extending outwardly of the outer stuffing box 36 is hollow. Suitable perforations 34c through the hollow shaft portion 34b at its inner end serve as passageways to the pipes 33. A suitable ball bearing 37 shown on an I-beam 38 may serve to support the hollow shaft portion 34b, to whose outer end portion may be affixed suitable driving means, such as a pulley 39, deriving its motion through a belt from an electric motor or other suitable prime mover (not shown). While the shaft 34 is thus being driven, suitable thermal-change medium may be fed thereinto by a pipe 40 surrounded by a suitable stuffing box 41 at the region where it enters the hollow shaft portion 34b.

The drive shaft 34 serves through suitable gearing to impart rotation to the various agitators or mixer 19. To this end, there is shown fixed to the solid shaft portion 34a a gear 42 meshing with wider-toothed gears 30 fixed to the hollow shafts 24 of the agitators of two opposite mixing compartments. The desired rotation of the agitator shafts of the other two mixing compartments is effected by gears 30a meshing with and of the same size as the gears 30. The gears 30a are sufficiently narrower-toothed than the gears 30 and are sufficiently offset laterally from the gear 42 to derive their motion solely from the gears 30 and thus to be rotated in a direction opposite to that of the gears 30. Accordingly, adjacent agitators in the mixing chamber are rotated in opposite directions to produce a whipping or beating action on the material being mixed akin to that effected by an egg beater. The blade elements 19 of adjacent agitators are positioned relative to one another so that the elements of one agitator enter in between the spaces of an adjacent agitator as all of the agitators are simultaneously being rotated in the mixing chamber and the outer edges of such elements 19 are generating cylindrical surfaces of revolution substantially within which the axis of such chamber lies. The inner end portion of the solid shaft portion 34a may be supported by a roller bearing 43 held by a hub 44 projecting outwardly of the closure member 14. Surrounding the hub 44 and in spaced relationship thereto is shown a second hub 45 for supporting the inner ball bearings 29 for the agitator shafts 24. The outer ball bearings 29' for the agitator shafts 24 may be supported by a ring member 46 fixed to pins 47 projecting outwardly from the closure member 14, as appears in Figures 1 and 2.

The desired revolvement of the apparatus as a whole about its axis and the substantially coaxial shaft 34 may be effected through a sprocket 48 forming part of a split ring member 49 suitably affixed to the exterior walls of the shells 11. Engaging the sprocket 48 may be an endless chain deriving its motive power from an electric motor or other suitable prime mover (not shown). It is thus seen that the apparatus as a whole is designed to be revolved about its axis independently of the rotation of the several agitators working within the mixing compartments or mixing chamber. The apparatus as a whole is shown journaled for rotation in a large annular bearing or ring structure 140 made up of two parts 14a and 14b fastened together as by bolts 15, the lower part being secured, as appears in Figure 1, by bolts 16 to I-beams 17 resting preferably on a raised open framework or platform 18. As shown, the end closures 14 are provided with a large outwardly projecting hub 50 projecting into such bearing 140. The upper portion 14a of the bearing 140 may be hollow, as shown in Figure 1, to receive therein hard grease 51 or other solid lubricant, a suitable cap 52 normally closing such opening. The left-hand end of the apparatus need not be described, as it is structurally similar to the right-hand end of the apparatus, excepting that the various driving gears for the agitators and the pulley drive for the axial shaft 34 may be omitted or provided, if desired, at such end.

The charging of the mixing chamber with the material to be mixed or reacted and discharge of the mixed or reacted material may be effected through one or more suitable quick-opening and quick-closing valve members 53 affixed to the external walls of the mixing chamber. Two such valves 53 are shown at opposite locations on the shell, one such valve being for the purpose of charging and the other for discharging the chamber. The mounting of the apparatus as a whole on a platform or open framework 18 enables ready discharge of the chamber contents into a receiving tank placed directly under one of the valves 53.

In operation, the apparatus as a whole may be revolved slowly as the compartmental agitators are being rotated at relatively high speed. Typically, the apparatus as a whole might make one R. P. M. while the agitators are being rotated at, say, 50 to 100 R. P. M. or greater speed. As the agitators are being rotated in the mixing chamber, they serve to shear through and beat the material in the mixing chamber and thus to effect extremely intimate mixture and homogenization of the material, since, as the blade elements 19 repeatedly clear or scrape the internal walls of the mixing chamber, redeposition of such material on the walls constantly takes place as the apparatus is being slowly revolved. There are thus no dead pockets or regions in the mixing chamber in which material can lodge to escape the variety of mixing forces at play. Indeed, the primary reason for conically shaping the inner end or hub portion of the agitator shaft is to cause material to shed therefrom, should it tend to lodge thereon. In other words, even the substantially neutral or zero-speed region of the agitators, wherein little centrifugal force is at play to redeposit the material being mixed on the wall, are designed to prevent accumulation of inactive or dead material thereon.

While the mixing apparatus hereof is designed to effect the mixing of various kinds of liquid and semi-liquid materials, it is especially adapted to mix and cause complete reaction between cellulose fiber, caustic soda solution, and liquid carbon bisulphide, to yield viscose or cellulose xanthate solution. In such case, it is important that the materials be mixed and homogenized so completely that there will be practically no residue of unreacted fiber. It is also desirable that the materials being mixed and reacted be maintained at a particular temperature during their reacting period and, after reaction, be quickly brought to an elevated temperature and then quickly cooled. Thus, during reaction, it is generally desirable that the materials be kept at about 15° C., whereas, after reaction, it is desirable to heat the viscose or cellulose xanthate solution quickly to elevated temperature so as to ripen it and then to cool the ripened solution quickly to low temperature, say, 15° C. The apparatus hereof enables such heating and cooling to be accomplished quickly and uniformly. Thus, while the materials are being mixed and reacted, suitable cooling or refrigerating medium may be passed through the mixing blades and, after their reaction has been completed, steam, hot water, or other heating medium may be passed through the blades to heat the xanthate or viscose solution rapidly to effect its ripening; and, immediately thereafter, a refrigerating or cooling medium may again be passed through the mixing blades to arrest rapidly the ripening action and thus determine or fix the degree of ripeness desired in the cellulose xanthate or vicsose solution.

As already stated, the apparatus hereof is a modification or specie of the apparatus generically disclosed and claimed in my application Serial No. 53,689, filed December 10, 1935. In addition to being useful for the various purposes described in some detail in that application and possessing the various advantages of the particular forms of apparatus described and illustrated in that application, the apparatus hereof presents the advantage of simpler and less expensive mechanical design or construction, since it is easier to construct the mixing apparatus hereof presenting internal walls corresponding to cylindrical surfaces of revolution than the particular forms of apparatus of that application presenting internal walls corresponding to substantially spherical surfaces of revolution; and the apparatus hereof affords further economies, including less expensive agitator structure and less expensive structure for passing fluid thermal-change medium through the agitator blades as they are being rotated simultaneously with the independent revolvement of the apparatus as a whole. There are other advantages inhering in the mixing apparatus hereof, including greatly enhanced mixing intensity at the central or axial zone of the mixing chamber, through which zone the blades of all the mixers or agitators sweep in rapid intermeshing succession while effecting thereat a shearing and whipping or beating action on the material being mixed as well as while they clear the compartmental wall surfaces; and there are, moreover, no throats or restricted passages in the apparatus through which material must pass in the course of its being mixed. Again, because of the balance, symmetry, and compactness of the apparatus about its horizontal axis of revolution, it may be revolved in the absence of chatter by inexpensive driving mechanism, for instance, by a sprocket and chain drive from an electric motor, as hereinbefore described. By reason of the symmetrical annular array of the compartments, the arrangement of driving gears for the agitators is such that it is possible to operate the apparatus satisfactorily even with one of these driving gears broken; and each compartment is accessible for local servicing or repair work without need of removing or disturbing any other compartment. The particular apparatus described and illustrated herein is further advantageous in that provision is made for taking the side thrust of the shafts for the mixing blades so that such blades do not tend to rub the internal compartmental walls; nor do such shafts tend to work or move sidewise in their stuffing boxes, thereby enabling vacuum or superatmospheric pressure to be created and held efficiently in the mixing chamber. As already indicated, the agitator for each compartment may be provided with driving gears at both its ends, which gears may be fixed to a common shaft passing through the compartment and serving as a rigid center support for the agitator blades, especially when the agitator blades are comparatively long or limber. Such central agitator shaft and blade-support may be hollow to permit the circulation of thermal-change fluid therethrough as well as through the hollow blades surrounding it.

I claim:

1. Apparatus of the class described comprising a plurality of intercommunicating, semi-cylindrical mixing compartments closed at their ends and arranged in side-by-side, annular relationship about a common, substantially horizontal axis of revolution for said apparatus as a whole, the axes of said compartments being substantially parallel with said common axis and the compartmental spaces merging with one another to constitute in effect a single mixing chamber closed at its ends, said common axis lying substantially in the cylindrical planes of curvature of said semi-cylindrical compartments, a rotary agitator arranged within each of said compartments and including a blade element substantially coextensive with and only slightly clearing the internal cylindrical wall of its compartment in the course of its rotation, said blade element generating in the course of its rotation a cylindrical surface of revolution substantially within which said common axis lies, means for simultaneously rotating adjacent agitators in opposite directions, and means for independently and simultaneously revolving the apparatus as a whole about said common axis.

2. Apparatus of the class described comprising a plurality of intercommunicating, semi-cylindrical mixing compartments closed at their ends and arranged in side-by-side, annular relationship about a common, substantially horizontal axis of revolution for said apparatus as a whole, the axes of said compartments being substantially parallel with said common axis and the compartmental spaces merging with one another to constitute in effect a single mixing chamber closed at its ends, said common axis lying substantially in the cylindrical planes of curvature of said semi-cylindrical compartments, a rotary agitator arranged within each of said compartments and including a plurality of spaced blade elements substantially coextensive with and clearing the internal cylindrical wall of their compartment and entering in the course of their rotation the spaces between the blades of an adjacent agitator, said blade elements generating in the course of their rotation cylindrical surfaces of revolution substantially within which said common axis lies, means for simultaneously rotating adjacent agitators in opposite directions, and means for independently and simultaneously revolving the apparatus as a whole about said common axis.

3. In mixing apparatus whose contents are to be quickly heated and cooled as well as mixed, a plurality of intercommunicating, semi-cylindrical mixing compartments closed at their ends and arranged in side-by-side, annular relationship about a common, substantially horizontal axis of revolution for said apparatus as a whole, the axes of said compartments being substantially parallel with said common axis and the compartmental spaces merging with one another to constitute in effect a single mixing chamber closed at its ends, said common axis lying substantially in the cylindrical planes of curvature of said semi-cylindrical compartments, a rotary hollow agitator arranged within each of said compartments and including a hollow blade element substantially coextensive with and slightly clearing the internal wall of its compartment in the course of its rotation, said blade element generating in the course of its rotation a cylindrical surface of revolution substantially within which said common axis lies, hollow shafts for rotating said agitators, a hollow drive shaft adapted to drive said agitator shafts simultaneously in opposite directions and disposed coaxially with said common axis, pipe connections from said drive shaft to said agitator shafts, means for passing fluid thermal-change medium by way of said drive shaft, pipe connections, and hollow agitator shafts through said rotary agitators as they are being simultaneously rotated, and means for independently and simultaneously revolving said apparatus as a whole about said common axis, including said drive shaft.

4. In mixing apparatus whose contents are to be quickly heated and cooled and whose mixing chamber is defined by a plurality of intercommunicating, semi-cylindrical compartments closed at their ends and arranged in side-by-side, annular relationship, said chamber having a substantially horizontal axis lying substantially in the cylindrical planes of curvature of said compartments, a plurality of spaced, rotary, hollow mixing blades in each compartment substantially coextensive with and clearing the cylindrical wall of the compartment, said blades generating in the course of their rotation cylindrical surfaces of revolution substantially within which said substantially horizontal chamber axis lies, hollow spiders connecting the ends of said blades, a hollow shaft leading from the central portion of said spider through an end of said compartment to the outside, means for simultaneously rotating the shafts of adjacent compartments in opposite directions, means for passing fluid thermal-change medium successively through each said hollow shaft, hollow spider, and hollow blades as they are being rotated, and means for independently revolving said apparatus as a whole about an axis parallel to the axes of said compartments in the course of rotation of said blades.

5. In mixing apparatus whose contents are to be quickly heated and cooled and whose mixing chamber is defined by a plurality of intercommunicating, semi-cylindrical compartments closed at their ends and arranged in side-by-side, annular relationship, said chamber having a substantially horizontal axis lying substantially in the cylindrical planes of curvature of said compartments, a plurality of spaced, rotary, hollow mixing blades in each compartment substantially coextensive with and clearing the cylindrical wall of the compartment, said blades generating in the course of their rotation cylindrical surfaces of revolution substantially within which said substantially horizontal chamber axis lies, hollow spiders connecting the ends of said blades, a hollow shaft leading from the central portion of said spider through an end of the compartment to the outside, the inner end portion of said shaft being closed and of conical shape and the blades of one compartment being arranged to enter into the spaces between the blades of an adjacent compartment in the course of rotation of the blades simultaneously in all the compartments, means for simultaneously rotating the shafts of adjacent compartments in opposite directions, means for passing fluid thermal-change medium successively through each said hollow shaft, hollow spider, and hollow blades as they are being rotated, and means for independently revolving said apparatus as a whole about an axis parallel to the axes of said compartments in the course of rotation of said blades.

ORTON B. BROWN.